(12) United States Patent
Suffner et al.

(10) Patent No.: US 11,168,598 B2
(45) Date of Patent: Nov. 9, 2021

(54) HEATED TUBING WITH PLUG, AND A METHOD FOR OPERATING THIS TUBING

(71) Applicant: TI Automotive (Fuldabrück) GmbH, Fuldabrück (DE)

(72) Inventors: Ingo Suffner, Fuldabrück (DE); Iris Barthel, Schauenburg (DE); Gerd Fischbach, Borken (DE); Albert Choo, Incheon (KR); Reiner Rohde, Malsfeld (DE); Kay Bube, Schenklengsfeld (DE); Michael Weissing, Heidelberg (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 2 days.

(21) Appl. No.: 16/496,808

(22) PCT Filed: Mar. 29, 2018

(86) PCT No.: PCT/IB2018/052157
§ 371 (c)(1),
(2) Date: Sep. 23, 2019

(87) PCT Pub. No.: WO2018/178909
PCT Pub. Date: Oct. 4, 2018

(65) Prior Publication Data
US 2021/0102485 A1 Apr. 8, 2021

(30) Foreign Application Priority Data
Mar. 29, 2017 (EP) ..................... 17163623

(51) Int. Cl.
*F01N 3/20* (2006.01)

(52) U.S. Cl.
CPC ........ *F01N 3/2066* (2013.01); *F01N 2610/02* (2013.01); *F01N 2610/10* (2013.01); *F01N 2610/1486* (2013.01)

(58) Field of Classification Search
CPC combination set(s) only.
See application file for complete search history.

(56) References Cited

U.S. PATENT DOCUMENTS 5,379,742 A * 1/1995 Breland ................. F02M 31/18
123/549
8,556,300 B2 10/2013 Isenburg et al.
(Continued)

FOREIGN PATENT DOCUMENTS

DE 202008013048 U1 4/2009
DE 102012020055 A1 4/2014
(Continued)

OTHER PUBLICATIONS

International Search Report dated Jun. 4, 2018.

*Primary Examiner* — Binh Q Tran
(74) *Attorney, Agent, or Firm* — Dickinson Wright PLLC (57) ABSTRACT

A tubing for a fluid medium of motor vehicles, in particular for an aqueous urea solution, comprises a tube, at least one heating wire, and a plug arranged on a tube end of the tube. The plug has a plug shank and a housing which surrounds the tube end and the heating wire. The plug shank comprises a latching means, preferably a collar, for latching in a connector. The tube has an inner tube and a contact element, wherein the heating wire is arranged between the inner tube and the contact element. The contact element brings the heating wire into contact with the inner tube, and the housing partially surrounds the contact element. A first segment of the heating wire runs on the tube end between the contact element and the inner tube, wherein a second seg- (Continued)

ment of the heating wire runs between the contact element and the housing.

18 Claims, 3 Drawing Sheets

(56) References Cited

U.S. PATENT DOCUMENTS

| | | | |
|---|---|---|---|
| 9,708,948 B2* | 7/2017 | Haeberer | F16L 53/38 |
| 9,765,914 B2 | 9/2017 | Isenburg et al. | |
| 10,012,336 B2* | 7/2018 | Hackel | F16L 53/35 |
| 10,508,577 B2* | 12/2019 | Rosenfeldt | F01N 13/0097 |
| 2010/0263740 A1* | 10/2010 | Borgmeier | F16L 25/01 |
| | | | 137/341 |
| 2012/0234421 A1* | 9/2012 | Powell | F16L 25/01 |
| | | | 138/33 |
| 2013/0220467 A1* | 8/2013 | Ristovski | F16L 37/144 |
| | | | 138/104 |

FOREIGN PATENT DOCUMENTS

| | | |
|---|---|---|
| EP | 2171337 B1 | 7/2008 |
| EP | 2420715 A2 | 2/2012 |
| WO | WO 2008/131993 A1 | 11/2008 |

* cited by examiner

HEATED TUBING WITH PLUG, AND A METHOD FOR OPERATING THIS TUBING

RELATED APPLICATIONS

This application is a 35 U.S.C. § 371 national phase application of International Application No. PCT/IB2018/052157, filed on Mar. 29, 2018 which claims the benefit of priority to European Patent Application 17163623.6, filed Mar. 29, 2017, and entitled "Heated Tubing With Plug, And A Method For Operating This Tubing" the entire contents of each of which are incorporated herein by reference.

FIELD

The disclosure relates to a tubing for a fluid medium of motor vehicles, in particular for an aqueous urea solution, comprising a tube, at least one heating wire, and a plug arranged on one tube end of the tube, wherein the plug has a plug shank and a housing surrounding the tube end and the heating wire, wherein the plug shank comprises a latching means, preferably a collar, for latching in a connector.

BACKGROUND

One heated tubing is known from EP 2 171 337 B1, by way of example. The tube shown therein has an inner tube and a contact element in the form of an adhesive tape, wherein the contact element brings two heating wires arranged in a double-helix pattern relative to each other in contact with the inner tube. The arrangement of inner tube, heating wires and contact element is also surrounded as well by a protective tube in the form of a corrugated tube. The housing of the plug partially surrounds the contact element, wherein the heating wires release from the inner tube inside the housing. In the housing, the heating wires are connected to a further heating wire of the plug shank via electrical connections. The heating wire of the plug shank is guided in a helical pattern by helical grooves or by a flat groove on the plug shank. Both the helical groove and the flat groove are alignment elements which serve to guide the heating wire. To protect the heating wire on the plug shank, the housing extends from the tube end, beyond the alignment elements, and into the tip of the plug shank. When the plug shank is inserted into a complementary connector, an axial overlap between the housing of the plug shank and the connector is also created. To produce a latching connection between the connector and the plug, the housing of the plug shank also has latching means which interact with complementary latching means in the connector, thereby producing the latching connection.

The fact that the heating wire is arranged on the plug shank, which results in a complex manufacturing process, is considered a disadvantage. There is also the risk of leakage if the housing of the plug shank is damaged, because then the latching means of the plug shank can slip out of the complementary latching means of the connector. The disclosure therefore addresses the technical problem of providing a tubing having a plug shank, for which the production cost is reduced and/or wherein the latching connection between the plug and connector has a more reliable design.

BRIEF SUMMARY

In one form, the present disclosure teaches a tubing for a fluid medium of motor vehicles, in particular for an aqueous urea solution, comprising a tube, at least one heating wire, and a plug arranged on one tube end of the tube, wherein the plug has a plug shank and a housing surrounding the tube end and the heating wire, wherein the plug shank comprises a latching means, preferably a collar, for latching in a connector.

The tube may have an inner tube and a contact element, wherein the heating wire is arranged between the inner tube and the contact element, wherein the contact element places the heating wire in contact with the inner tube, and wherein the housing partially surrounding the contact element.

The tubing may also have a first segment of the heating wire that runs on the tube end between the contact element and the inner tube, and wherein a second segment of the heating wire runs between the contact element and the housing.

The present disclosure is based on the realization that, due to the additional routing of the heating wire between the contact element and the housing, it is possible to accommodate a sufficient length of the heating wire in the housing so that the entire plug is sufficiently heated. As a result, it is no longer necessary to undertake a difficult mechanical and/or manual winding around the plug shank. In addition, there is no need for a comprehensive enclosure of the plug shank by the housing, such that the plug shank itself can comprise the latching means. Since the plug shank is substantially more compact than the housing, and can be designed as an integral part (in one casting), it is significantly more stable, and an accordingly produced latching connection is also significantly more reliable as a result.

The term "inner tube" particularly means a separate, and preferably separately-extruded, tube part. However, the inner tube can also be an inner wall section of the separate tube part. The term "contact element" particularly means an adhesive tape and/or a heat shrink tube and/or an outer wall segment of the separate tube part.

The term "tube end" particularly means the segment of the tube surrounded by the housing, including the end face of the tube assigned to the plug shank. The term "segment" particularly means a segment in axial orientation. The term "axial" particularly means the axis of the plug shank and/or tube.

Preferably, the plug shank is designed to be inserted in a fluid-tight manner into a connector. Conveniently, the outer side of the plug shank is sufficiently smooth for fluid tightness, such that it can cooperate with one or more sealing rings of the connector. It is also possible that the plug shank has a sealing ring or sealing rings so as to be able to cooperate in a fluid-tight manner with a connector which is constructed with a correspondingly smooth inner side.

Expediently, the at least one heating wire runs along the tube toward the plug. According to a very preferred embodiment, the tube has two heating wires which are surrounded by the contact element. It is advantageous to arrange the two heating wires in a double helix pattern on the inner tube. The housing expediently has an inner side facing the tube end, and an outer side. It is preferable that the housing surrounds at least one electrical connection.

Advantageously, the plug shank comprises a sealing segment and a latching segment, wherein the latching segment is functionally assigned to the tube end, and wherein the sealing segment comprises a sealing arrangement or is functionally assigned to a sealing arrangement of the connector. Preferably, the sealing segment and the latching segment are separated from each other by the latching means of the plug shank, and/or are separated by the collar. The latching segment expediently lies in the axial direction between the sealing segment and the contact element and/or a protective tube. The plug shank preferably has an end face functionally assigned to the tube end, and an end face remote from the tube end. The term "end face" particularly means the annular surfaces in the cross-sectional plane on the two terminal ends of the plug shank. The plug shank expediently has an outer side and an inner side, wherein the inner side preferably forms a channel, wherein said channel connects the end faces of the plug shank together for the purpose of conveying the fluid medium through the plug shank.

It is very advantageous if the second segment of the heating wire has a length which is at least 1.5 times, preferably at least 2 times, and more preferably at least 3 times greater than the extension of the second segment of the heating wire in the axial direction. The term "axial direction" particularly means the direction of the tube axis. The length of the second segment of the heating wire is expediently chosen in such a manner that it is preferably at most 20 times, and preferably at most 15 times greater than the extension of the second segment of the heating wire in the axial direction. According to a preferred embodiment, the tubing has a second heating wire, wherein a first segment of the second heating wire runs on the tube end between the contact element and the inner tube, and wherein a second segment of the second heating wire runs between the contact element and the housing. It is expedient if the second segment of the second heating wire is sized like the second segment of the heating wire and/or the first heating wire. It is possible that the second segment of the heating wire and/or the first heating wire and/or the second heating wire has at least one helical and/or loop-shaped and/or meandering subsegment. It is preferred that the subsegment or subsegments comprise(s) at least one, but preferably a plurality of, windings. The windings of the subsegment or subsegments can be coaxially aligned relative to each other or offset from each another. The subsegment or subsegments is/are expediently surrounded by the housing and is/are preferably arranged between the contact element and the housing.

According to a particularly preferred embodiment, the plug shank and preferably the plug are free of alignment elements arranged in or on the plug shank and/or the plug for aligning the heating wire. The term "alignment element" particularly means elements which only serve to orient the heating wire, such as grooves or pins or projections on the outer side of the plug shank and/or on the inner side of the housing. The term "alignment elements" particularly does not mean elements which merely press the heating wire against the plug shank and/or the tube end and/or the inner tube and/or the housing, such as adhesive tapes or heat shrink tubes. Accordingly, the cylindrical walls of the tube end and/or the inner tube and/or the contact element are not alignment elements in the context of the disclosure. Although these walls can touch the heating wire and thus deform and align, these cylindrical walls primarily serve the purpose of sealing—and not exclusively the alignment of the heating wire. Coaxial cylindrical walls are therefore preferably not alignment elements in the context of the disclosure. The term "alignment element" particularly means elements having walls which protrude radially on the outer side of the plug shank and/or the tube end and/or the housing. In particular, elements which align electrical connections in addition to the heating wire are not alignment elements for aligning the heating wire.

It is very preferred that a heat conducting element is arranged in the interior of the tube end, and said heat conducting element extends into the plug shank and preferably into a, and/or the, sealing segment of the plug shank. The tubing is preferably designed in such a manner that the heat of the heating wire or heating wires is transmitted to the heat conducting element, such that the plug shank and/or a channel of the plug shank is/are heated via the heat-conducting element. The heat-conducting element is preferably arranged in the interior of the inner tube. An inner side of the inner tube expediently surrounds the heat conducting element along a first axial segment. Preferably, the plug shank, and preferably the inner side of the plug shank, surrounds the heat conducting element along a second axial segment. It is preferred that the inner side of the inner tube is in contact with the heat conducting element, wherein the contact is preferably a pressure contact, preferably in the radial direction. The heat conducting element is expediently arranged in the interior of the tube end in such a manner that the heat conducting element can be brought into contact with the fluid. Advantageously, the heating wire or the heating wires and the heat conducting element overlap in sections in the axial direction. It is preferred that the overlap between the heating wire or the heating wires and the heat conducting element is a non-contact overlap. Preferably, the heating wire or the heating wires are separated by the inner tube of the heat conducting element. The heating wire expediently surrounds, or the heating wires expediently surround, the heat conducting element along an axial segment. The heat conducting element expediently comprises metal or a thermally conductive plastic, and is particularly preferably designed as a helical spring. It is preferred that the heat conducting element is only indirectly heated via the heating wire or the heating wires, and in particular has no electrical connections. In this sense, the heat conducting element is expediently a passive heating element. The heat conducting element is preferably arranged in the inner tube along at least 20%, more preferably at least 25%, and particularly preferably at least 30% of its length.

According to a very preferred embodiment, the heating wire or the heating wires and the plug shank do not overlap in the axial direction. Advantageously, the heating wire running towards the plug and/or the heater wires running towards the plug extend(s) up to an end face of the plug shank which is functionally assigned to the tube end, wherein the heating wire or the heating wires change its/their direction on the end face of the plug shank which is functionally assigned to the tube end, such that the heating wire or the heating wires travel(s) back over at least one partial section starting from this end face of the plug shank. Preferably, the heating wire or the heating wires is/are attached only on the tube and/or tube end, and is/are in particular not attached to the plug shank or to the housing. It is possible that the heating wire or the heating wires is/are attached indirectly, and in particular via an electrical connection, to the tube end. It is very preferred that one electrical connection or multiple electrical connections are attached to the tube end. The term "attached" particularly means a reversible attachment, and in particular not with direct contact. It is possible for a segment of a holder to be arranged between the tube and the electrical connection and/or the electrical connections.

According to a particularly advantageous embodiment, the housing surrounds at most 70%, preferably at most 50%, and particularly preferably at most 30% of the axial extension of the plug shank. It is preferred that the housing surrounds at most 40%, more preferably at most 20%, and most particularly preferably at most 10% of the axial extension of the plug shank. According to a very particularly preferred embodiment, the housing surrounds only one engagement element—preferably a flange—of the plug shank on an end face of the plug shank which is functionally assigned to the tube end.

It is very advantageous if the housing surrounds a holder for holding the at least one heating wire and/or at least one electrical connection on the tube end. The holder is preferably designed to be separate from the plug shank and/or the housing and/or the tube. The holder can preferably be latched onto the tube end, and preferably is arranged on the tube end by clamping after the latching. The holder expediently has a groove for a preferably latching- and particularly preferably latching and clamping, reception of the tube and/or the tube end and/or the inner tube and/or the inner tube with contact element. The holder expediently sits on the contact element. The contact element preferably comprises an adhesive tape and/or a heat shrink tube on the tube end. Preferably, the holder contacts the heat shrink tube of the contact element.

The holder preferably comprises at least one receptacle, and further preferably at least two or three receiving grooves, for receiving an electrical connection and/or multiple electrical connections. The receptacle and/or receptacles of the holder is/are expediently hollow-cylindrical in design, and is/are preferably aligned parallel to the tube axis. The openings of the receptacles preferably face the plug shank. The receptacle or receptacles preferably each comprise(s) one stop acting in the axial direction, wherein the stop is preferably arranged on an end face of the respective receptacle which is remote from the plug shank. The receptacle or receptacles are advantageously designed in such a manner that they receive the electrical connection or the electrical connections by clamping.

The holder and/or the housing is/are particularly preferably designed in such a manner that they do not touch each other. Expediently, the electrical connection or the electrical connections and the housing do not contact each other.

Particularly preferably, the heating wire has a strand with a plastic coating, wherein the plastic coating preferably comprises a fluoroplastic. The fluoroplastic is preferably a thermoplastic, and particularly preferably polyvinylidene fluoride (PVDF). The plastic coating is preferably at least 0.05 mm, further preferably at least 0.1 mm, and particularly preferably at least 0.12 mm thick. The plastic coating is expediently at most 1.0 mm, preferably 0.6 mm, and particularly preferably at most 0.4 mm thick. It is very preferable that the strand can be seen through the plastic coating. The strand suitably comprises one or a plurality of individual wires, and preferably has copper and/or a copper/nickel alloy. The strand is expediently at least 0.3 mm, preferably at least 0.4 mm, and particularly preferably at least 0.5 mm thick. The strand is advantageously at most 1.2 mm, more advantageously at most 1.0 mm, and particularly advantageously not more than 0.8 mm thick.

According to a first, particularly preferred embodiment, the tube comprises a protective tube, wherein the protective tube is preferably sealed with respect to the inner tube on the end of the tube. The inner tube is expediently a separate, and preferably a separately extruded, tube part, wherein said tube part is surrounded by a preferably separately-formed contact element, wherein the contact element is preferably surrounded by the protective tube. The protective tube is, for example, a corrugated tube or a continuous, correspondingly thick tubular element. However, the tube can also be a one-piece component in which the heating wire or the heating wires is/are embedded. The at least one heating wire is expediently not in contact with the fluid channel of the tube, which is why the inner tube of this one-piece component is an inner wall segment of the one-piece tube, wherein the inner wall segment is surrounded by the heating wire or the heating wires. An outer wall segment of the one-piece component surrounds the heating wire or the heating wires, and as a result brings the heating wire or the heating wires in contact with the inner tube. According to this embodiment, the outer wall segment is thus the contact element.

Advantageously, the inner tube, along with the heating wire or the heating wires and preferably also the contact element in the form of the adhesive tape, projects beyond the protective tube. Preferably, the protective tube is sealed with respect to the inner tube by means of a heat shrink tube of the contact element. The heat shrink tube of the contact element preferably surrounds an end segment of the protective tube and a segment of the inner tube with the heating wire or the heating wires and/or with the adhesive tape. On the tube end, the contact element preferably comprises a, and/or the, adhesive tape and a heat shrink tube, wherein the heat shrink tube preferably surrounds the adhesive tape. It is preferred that the housing completely surrounds the seal and/or the heat shrink tube of the contact element and/or the segment of the inner tube which projects beyond the protective tube.

It is preferred that the housing encloses a space filled with air between itself and the tube end. A space filled with air is particularly not present in housings which are molded around the tube end. It is expedient that the heating wire or the heating wires is/are positioned at least sectionally within the space filled with air. Advantageously, the space filled with air extends from an end face of the housing which is functionally assigned to the plug shank to an end face of the housing which is remote from the plug shank. It is preferred that the electrical connection or the electrical connections are arranged in the space filled with air. At least the tube end, and/or the holder and/or the seal and/or the heat shrink tube, is/are expediently surrounded by the space filled with air. In particular, the housing is not filled in by an injection molding filling—not even in sections thereof. The space filled with air is expediently used for thermal insulation. According to a preferred embodiment, the housing comprises housing parts connected to each other. The term "connected to each other" particularly means that the housing parts were not originally connected to each other, such that after the connection, the housing has a connection point or connection points. These connection points are, for example, latching elements, welded seams, or the like. Preferably, the housing comprises at least two, and particularly preferably only two, housing parts. The housing parts are preferably housing shells, and particularly preferably two housing half shells. The housing is expediently designed in such a manner that it encloses a space filled with air between itself and the connector.

Preferably, a segment of the tube end and/or the inner tube is inserted into the plug shank and/or into a receptacle of the plug shank. The receptacle of the plug shank preferably comprises a stop for the tube end and/or the inner tube. It is preferred that the size of the inner diameter of the receptacle is chosen so that the inner tube is clamped in the receptacle. Most preferably, the inner tube is joined to the receptacle by means of laser radiation welding. It is expedient if the plug shank and the inner tube are colored black, but the plug shank is also translucent for infrared or near-infrared radiation. The inner tube is expediently designed to be opaque to infrared or near-infrared radiation.

Advantageously, the housing has an engagement element for engagement with the plug shank, wherein the engagement element of the housing is preferably arranged on an end face of the housing, and particularly preferably on an end face of the housing which faces the connector. The engagement element of the housing is preferably a groove or a flange, wherein the engagement element of the housing is expediently engaged with an engagement element of the plug shank. The engagement element of the plug shank is preferably a flange or a groove, and particularly preferably a flange. The engagement element of the plug shank is expediently arranged in the region of the latching segment, and preferably on an end face of the plug shank which is functionally assigned to the tube end. The housing expediently comprises a retaining element for engagement with a protective tube, wherein the retaining element is preferably arranged on an end face of the housing which is remote from the plug shank. The retaining element of the housing is preferably a flange for engagement with the protective tube.

It is preferred that the housing surrounds at least one electrical connection, and preferably two or three electrical connections, which are used to establish a contact between the heating wire and a PTC thermistor, or to establish a contact between two heating wire segments. The at least one PTC thermistor preferably leads to an external electrical plug connection assigned to the plug. The electrical connection expediently comprises an electrical contact, such as a ferrule or soldered connection, and preferably a heat shrink tube as well. The term "electrical connection" particularly does not mean a continuous heating wire. According to a first embodiment, the housing surrounds only one electrical connection. In this case, the inner tube preferably only has one heating wire, in which case the heating wire is connected inside the housing and inside the electrical connection with a PTC thermistor, wherein said PTC thermistor is routed out of the housing. According to a second embodiment, the tube has two heating wires, wherein the heating wires are connected inside the housing in one of the two electrical connections to a PTC thermistor. According to a third embodiment, the housing surrounds three electrical connections.

According to this embodiment, the tube comprises two heating wires and the plug has its own separate heating wire. In the first electrical connection, the first heating wire of the tube and the first end of the heating wire of the plug are connected to each other. In the second electrical connection of this embodiment, the second end of the heating wire of the first connector and a first PTC thermistor are connected to each other. In the third electrical connection, the second heating wire of the tube and the second PTC thermistor are connected to each other. According to a fourth embodiment, the plug has its own separate heating wire and the tube comprises two heating wires. The first heating wire of the tube is connected to the first end of the heating wire of the plug via a first electrical connection, whereas the second heating wire of the tube is connected to the second end of the heating wire of the plug via a second electrical connection. According to this embodiment, the plug does not have a PTC thermistor. As a result, the housing surrounds two electrical connections. According to a fifth embodiment, the housing surrounds no electrical connection, because only a single continuous heating wire is present. The continuous heating wire is preferably arranged in a double helix pattern on the inner tube, and expediently ends in a loop within the housing.

The present disclosure also teaches a method of operating a tubing for a fluid medium of motor vehicles, in particular a tubing according to the disclosure, wherein the tubing comprises a tube, at least one heating wire, and a plug arranged on one tube end of the tube, wherein the plug has a plug shank and a housing surrounding the tube end and the heating wire, wherein the plug shank comprises a latching means, preferably a collar, for latching in a connector, wherein the tube has an inner tube and a contact element, wherein the heating wire is arranged between the inner tube and the contact element, wherein the contact element brings the heating wire in contact with the inner tube, wherein the housing surrounds the contact element, wherein a first heating power is applied to at least a part of the length of the tube and the plug during operation of the tubing, by means of the first segment of the heating wire, and in that a second segment of the heating wire runs between the contact element and the housing and applies a second heating power to the plug.

It is particularly preferred that the second heating power of the second segment of the heating wire is at least partially transferred to a heat conducting element, in particular a heat conducting element according to the disclosure. It is particularly preferred that the heat conducting element heats the plug shank from inside, and in particular heats a sealing segment of the plug shank from inside.

BRIEF DESCRIPTION OF THE DRAWINGS

The disclosure is explained in detail below with reference to a drawing which illustrates only one embodiment, wherein, in schematic illustration.

DETAILED DESCRIPTION

Figure 1:
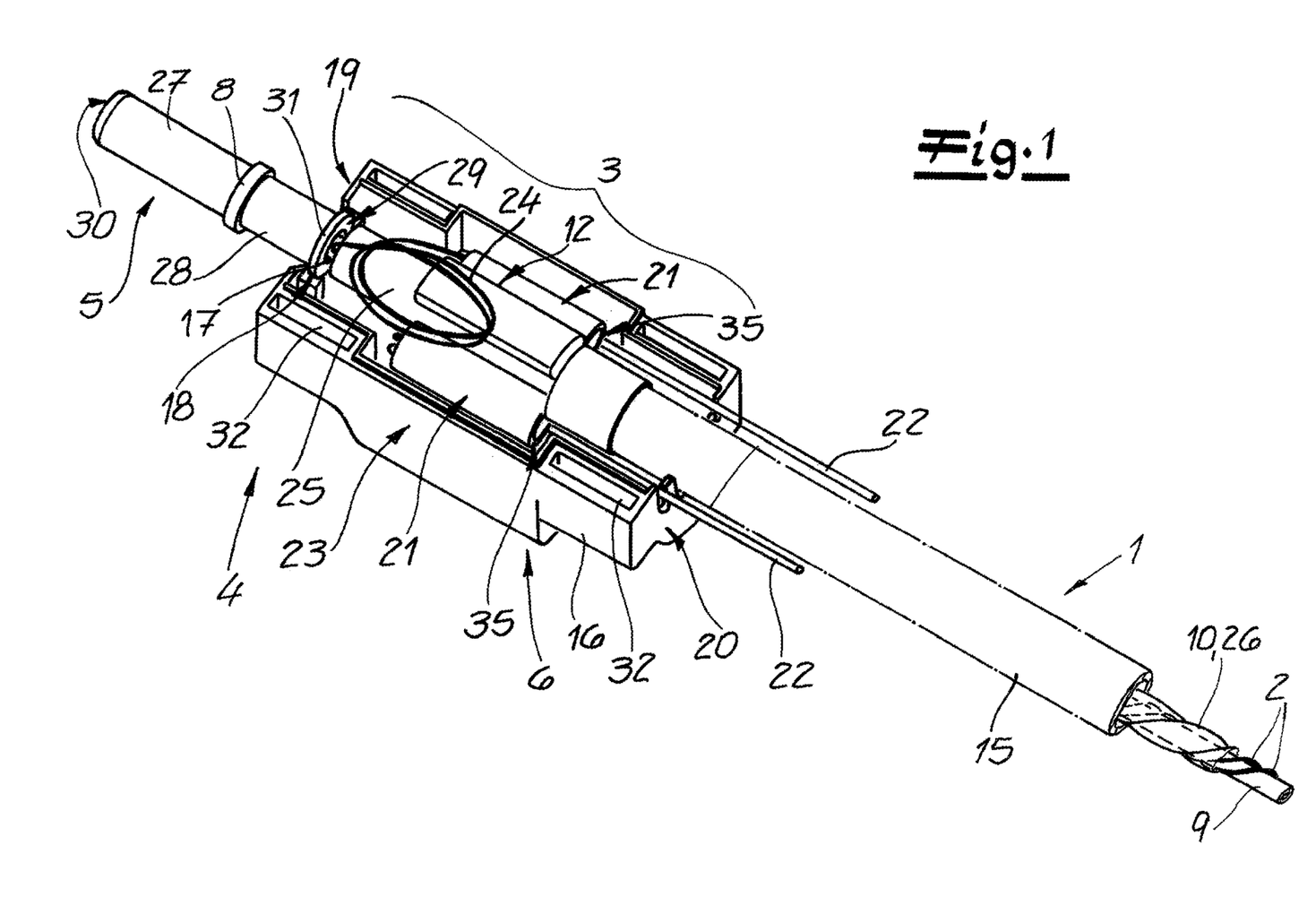
FIG. 1 shows a tubing according to the disclosure in a perspective illustration, with the housing open.

FIG. 1 illustrates a tube 1 which is connected on its left tube end 3 to a plug 4. The tube 1 comprises an inner tube 9 and two heating wires 2 which lie against the inner tube 9 and are wound around the inner tube 9 in a double helix pattern. A contact element 10 comprising an adhesive tape 26 is wound around the heating wires 2 and the inner tube 9. A protective tube 15 surrounds the arrangement of the inner tube 9, the heating wires 2 and the contact element 10, 26. For the purpose of thermal insulation, the protective tube 15 is spaced apart from the adhesive tape 26 such that an insulating air jacket exists between the protective tube 15 and the adhesive tape 26.

The plug 4 comprises a plug shank 5 and a housing 6, wherein the housing 6 surrounds the tube end 3. The plug shank 5 has a latching means 8 in the form of a collar to establish a latching connection with a connector 7, which is not shown in FIG. 1. One end face 29 of the plug shank is functionally assigned to the tube end 3, and one end face 30 of the plug shank is remote from the tube end. An engagement member 31 in the form of a flange is arranged on the end face 29 of the plug shank 5 which is functionally assigned to the tube end 3. The plug shank 5 has a sealing segment 27 between the end face 30 which is remote from the tube end 3 and the latching means 8. A latching segment 28 of the plug shank 5 is positioned between the latching means 8 and the end face 29 which is functionally assigned to the tube end 3. The end face 30 of the plug shank 5 which is remote from the tube end 3 is tapered for ease of insertion into the connector 7.

The engagement element 31 of the plug shank 5 engages with a complementary engagement element 18 in the form of a groove of the housing 6, thereby producing a high-tensile connection between the housing 6 and the plug shank 5. The engagement element 18 is arranged in the vicinity of an end wall 19 of the housing 6 which faces the connector 7. The housing 6 has two housing parts 16, wherein for the sake of clarity in FIG. 1, only the lower housing part 16 is depicted. The housing parts 16 are connected to each other by means of latching means 32.

In contrast, the inner tube 9 is connected to the plug shank 5 by insertion into a receptacle 17 of the plug shank 5 and subsequent laser beam welding or laser transmission welding. The plug shank 5 is therefore, like the inner tube 9 as well, made of plastic, and preferably made of polyamide. The plug shank 5 is colored black, but at the same time is permeable to near-infrared and/or infrared radiation. In contrast, the inner tube 9 is impermeable to near-infrared and/or infrared radiation 25, such that a reliable welded seam is created at the interface in the receptacle 17.

The inner tube 9 projects beyond the protective tube 15 on the tube end 3, wherein the protective tube 15 is sealed with respect to the inner tube 9 and/or the adhesive tape 26 with the heating wires 2 by means of a heat shrink tube 25 of the contact element 10. On the tube end 3, the heat shrink tube 25 of the contact element 10 surrounds the adhesive tape 26 of the contact element 10, wherein, also on the tube end 3, both the adhesive tape 26 of the contact element 10 and the heat shrink tube 25 of the contact element 10 bring the heating wires 2 into contact with the inner tube 9.

The heating wires 2 leave the inner tube 9 between the end face 29 of the plug shank 5 and the contact element 10, wherein for the sake of simplicity in FIG. 1, only the upper heating wire 2 is depicted. The upper heating wire 2 is folded into a plurality of windings of a loop-shaped segment 24, and ultimately is routed into an electrical connection 21. There, the upper heating wire 2 is electrically connected to a PTC thermistor 22. The course of the lower heating wire 2 is analogous to the upper heating wire 2, but is not visible in FIG. 1.

The electrical connections 21 are fastened in a holder 12, wherein the holder 12 is in turn fastened to the heat shrink tube 25 on the tube end 3. Details of this attachment are discussed again below. The PTC thermistors 22 emerging from the housing 6 pass through an end face 20 of the housing 6 which is remote from the plug shank 5. The end face 20 of the housing 6 has two recesses for this purpose. The holder 12 and the electrical connections 21 are preferably arranged in a middle segment 23 of the housing 6. The housing 6 and/or the middle segment 23 is/are designed in such a manner that the holder 12 and/or the electrical connections 21 do not contact the housing.

Figure 2:
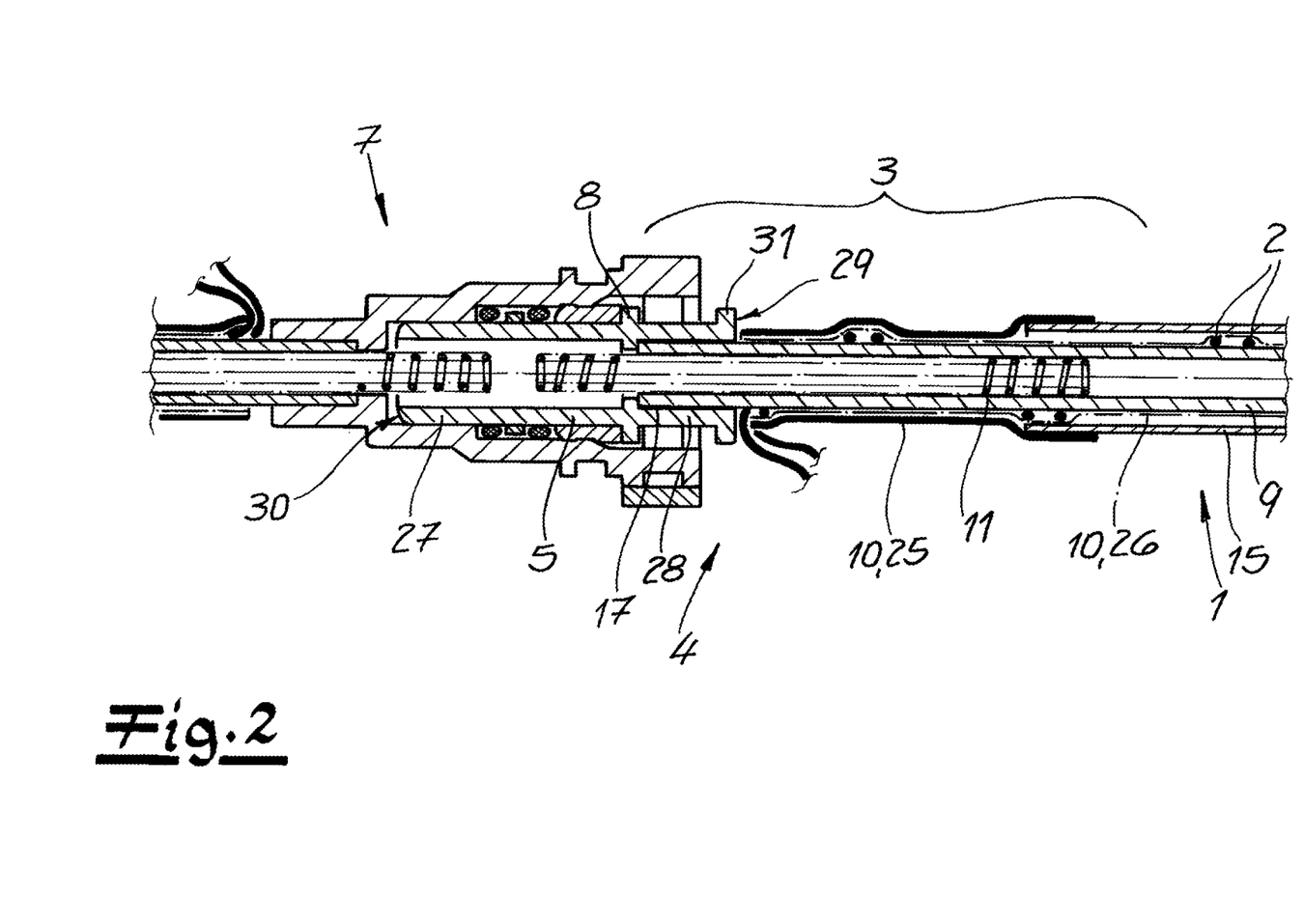
FIG. 2 shows the tubing of FIG. 1 in longitudinal section without the housing, the holder, electrical connections, and the heating wire positioned between the contact element and the housing.

In FIG. 2, the structure of FIG. 1 is shown in longitudinal section, wherein the housing 6, the holder 12 and the heating wires 2, the electrical connection 21 and the PTC thermistor 22 are omitted for reasons of clarity. The receptacle 17 of the plug shank 5 into which the inner tube 9 is inserted, and abuts the end of the receptacle 17, can be seen in this figure. In addition, FIG. 2 illustrates the cooperation of the plug shank with the connector 7. As such, the connector 7 has a seal assembly in the interior thereof, comprising two sealing rings which ensure a seal together with the sealing segment 27 of the plug shank 5. In addition, a subsegment of a latching element which has two U-legs which are not shown is indicated on the lower, right side of the connector. These U-legs engage behind the latching means 8 of the plug shank 5 in the region of the latching segment 28 of the plug shank 5, such that a latching connection is made possible.

Finally, it is apparent from FIG. 2 that a heat conducting element 11 in the form of a coil spring is inserted into the inner tube 9 on the tube end 3. This heat conducting element 11 extends into the sealing segment 27 of the plug shank 5. In this case, the heating wires 2 generate, in particular via the loop-shaped segments 24 within the housing 6, a heating power density which exceeds the heating power density in the middle segment of the tube 1. This heating power surplus also heats the heat conducting element 11, which carries the heat into the plug shank 5 without any electrical connection. This approach prevents freezing, in particular inside the sealing segment 27 of the plug shank 5.

Figure 3:
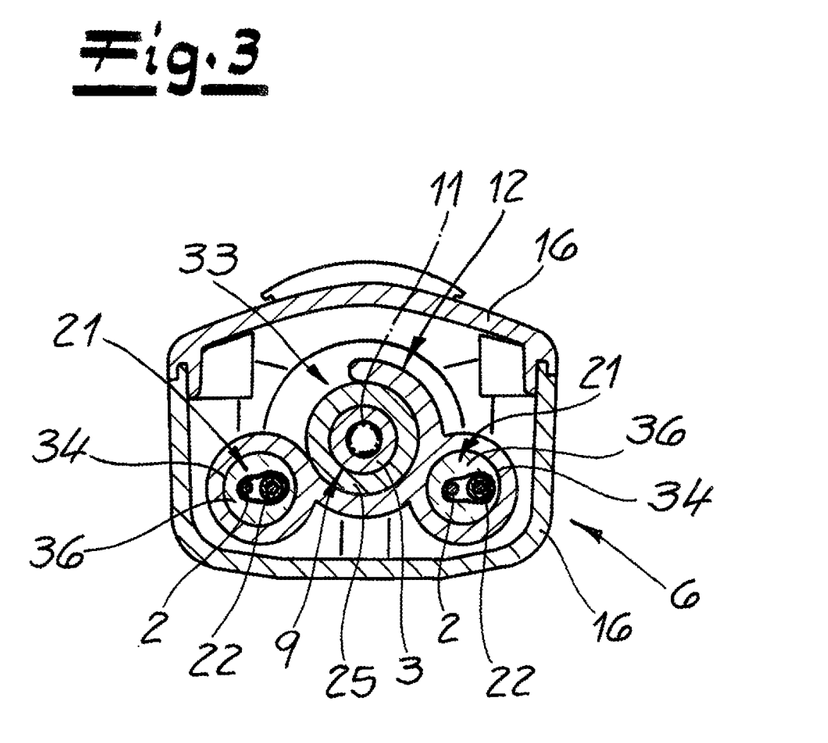
FIG. 3 shows a cross-section of the housing, holders and tube end of FIG. 1.

In FIG. 3, the holder 12 on the tube end 3 is shown slightly enlarged. The holder 12 comprises a groove 33 in which the tube end 3—which is only indicated in this figure—is engaged. Since the tube end 3 is sheathed with the heat shrink tube 25, the groove 33 is suitably designed in such a manner that it receives the tube end 3 not only by latching, but also with a permanent clamping, and therefore with a friction lock. In addition, the holder 12 in this embodiment comprises two receptacles 34 for each electrical connection 21. The receptacles 34 of the holder 12 are formed in this embodiment as hollow cylinders and aligned parallel to the tube axis. The receptacles 34 of the holder 12 have openings which face the plug shank 5. The receptacles 34 of the holder 12 also each have a stop 35 on their end remote from the plug shank 5, wherein said stop 35 ensures a defined position of the electrical connections 21. Like the plug shank 5, the holder 12 is made of plastic and formed by injection molding.

The electrical connections 21 each comprises a heat shrink tube 36, wherein said heat shrink tube 36 surrounds a ferrule together with partial lengths of the heating wire 2 and the PTC thermistor 22. The ferrule establishes an electrical contact between the heating wire 2 and the PTC thermistor 22. Due to the heat shrink tube 36, the electrical connections 21 are also equipped with a relatively soft surface. As a result of a friction-locking insertion of the electrical connections 21 into the openings of the receptacles 34 of the holder 12, the electrical connections 21 are advantageously permanently clamped by the receptacles 34.

Figure 4:
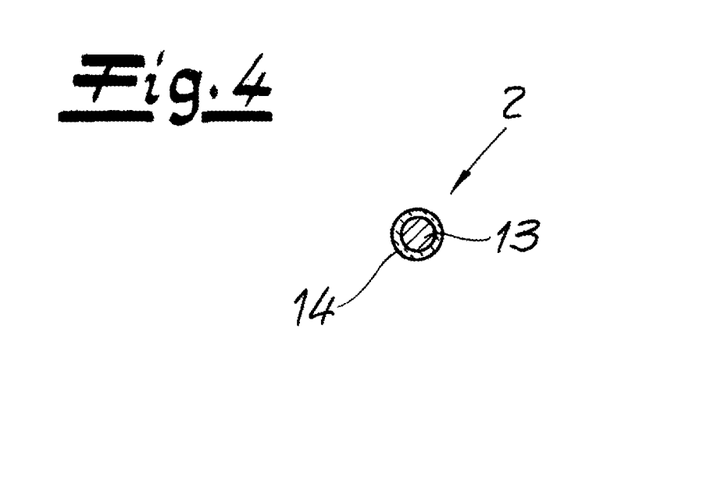
FIG. 4 shows a cross-sectional view of the heating wire from FIGS. 1 to 3.

Finally, FIG. 4 shows a cross-section of the heating wire 2. The heating wire 2 comprises a strand 13 of metal, preferably copper. The strand 13 is surrounded by a plastic coating 14, which in this embodiment comprises polyvinylidene fluoride (PVDF) and has a thickness of 0.2 mm. The strand 13 in this embodiment has a diameter of 0.6 mm.

The invention claimed is:

1. A tubing for a fluid medium of motor vehicles, comprising a tube, at least one heating wire, and a plug arranged on a tube end of the tube, wherein the plug has a plug shank and a housing surrounding the tube end and the heating wire, wherein the plug shank comprises a a collar for latching in a connector;

wherein the tube has an inner tube and a contact element, wherein the heating wire is arranged between the inner tube and the contact element, wherein the contact element brings the heating wire in contact with the inner tube, and wherein the housing partially surrounds the contact element; and     wherein a first segment of the heating wire runs on the tube end between the contact element and the inner tube, wherein a second segment of the heating wire runs between the contact element and the housing, and wherein the second segment of the heating wire leaves the inner tube between an end face of the plug shank and the contact element.

2. The tubing according to claim 1, wherein the second segment of the heating wire has a length which is at least 1.5 times greater than the extension of the second segment of the heating wire in the axial direction.

3. The tubing according to claim 1, wherein the plug shank and the plug are free of alignment elements arranged in or on the plug shank and plug for aligning the heating wire.

4. The tubing according to claim 1, wherein a heat conducting element is arranged in the interior of the tube end, and said heat conducting element extends into the plug shank.

5. The tubing according to claim 1, wherein the heating wire and the plug shank do not overlap in the axial direction.

6. The tubing according to claim 1, wherein the housing surrounds at most 70%, of the axial extension of the plug shank.

7. The tubing according to claim 1, wherein the housing surrounds a holder for holding the at least one heating wire or at least one electrical connection on the tube end.

8. The tubing according to claim 1, wherein the heating wire has a strand with a plastic coating, and wherein the plastic coating comprises a fluoroplastic.

9. The tubing according to claim 1, wherein the tube comprises a protective tube, and wherein the protective tube is sealed with respect to the inner tube on the tube end.

10. The tubing according to claim 1, wherein the housing encloses a space filled with air between itself and the tube end.

11. The tubing according to claim 7, wherein the housing and the holder are designed in such a manner that they do not contact each other.

12. The tubing according to claim 1 wherein a segment of the tube end or the inner tube is inserted into the plug shank or into a receptacle of the plug shank.

13. The tubing according to claim 1, wherein the housing surrounds at least one electrical connection, which is used to establish a contact between the heating wire and a PTC thermistor, or to establish a contact between two heating wire segments.

14. The tubing according to claim 7, wherein the holder has at least one receptacle, for receiving an electrical connection, wherein the receptacle is hollow-cylindrical in design.

15. The tubing according to claim 1, wherein the second segment of the heating wire has a length which is at least 3 times greater than the extension of the second segment of the heating wire in the axial direction.

16. The tubing according to claim 4, wherein said heat conducting element extends into the sealing segment of the plug shank.

17. A method for operating a tubing for a fluid medium of motor vehicles, wherein the tubing comprises a tube, at least one heating wire, and a plug arranged on one tube end of the tube, wherein the plug has a plug shank and a housing surrounding the tube end and the heating wire, wherein the plug shank comprises a collar for latching in a connector, wherein the tube has an inner tube and a contact element, wherein the heating wire is arranged between the inner tube and the contact element, wherein the contact element brings the heating wire in contact with the inner tube, and wherein the housing partially surrounds the contact element, applying a first heating power to at least one partial length of the tube and the plug by means of the first segment of the heating wire, during operation of the tubing, and applying a second heating power to the plug by a second segment of the heating wire that runs between the contact element and the housing, and leaves the inner tube between an end face of the plug shank and the contact element.

18. The tubing according to claim 1, wherein the second segment of the heating wire is folded backwards and routed into an electrical connector in the housing.

* * * * *